June 21, 1966 J. B. RIDDLE ETAL 3,256,968

DOCUMENT RECOGNIZING APPARATUS

Filed Aug. 13, 1963 2 Sheets-Sheet 1

INVENTORS
JOHN B. RIDDLE
ROBERT B. McLAUGHLIN

BY Naylor & Neal

ATTORNEYS

DOCUMENT RECOGNIZING APPARATUS

Filed Aug. 13, 1963 2 Sheets-Sheet 2

INVENTORS
JOHN B. RIDDLE
ROBERT B. McLAUGHLIN
BY
Naylor & Neal
ATTORNEYS

3,256,968
DOCUMENT RECOGNIZING APPARATUS

John B. Riddle and Robert B. McLaughlin, Palo Alto, Calif., assignors to Micro Magnetic Industries, Inc., Palo Alto, Calif., a corporation of California Filed Aug. 13, 1963, Ser. No. 301,711
17 Claims. (Cl. 194—4)

This invention relates to apparatus for recognizing documents and more particularly to automatic apparatus for recognizing paper money.

It is a general object of this invention to provide automatic apparatus for recognizing printed money which will operate efficiently where left unattended for long periods of time and which will, as nearly as possible, recognize all valid pieces of currency which it is desirable to recognize while defying all attempts to fool the apparatus both when counterfeits are presented to the apparatus and when valid pieces of money and parts thereof are presented to the apparatus.

In accordance with this invention, recognizing apparatus is provided in which a predetermined area of valid money is optically scanned in sufficient detail that the apparatus will identify a predetermined pattern of parallel lines on said area and determine that the lines are properly spaced and sufficiently sharp and clear that they were produced by a process equivalent to intaglio printing. This scanning is performed by moving a transparent mask and a piece of money to be examined with respect to each other and in a linear direction inclined to the lines of the pattern while maintaining the money and the mask in engagement with each other; the mask carries a pattern of parallel spaces and lines which correspond to the lines and spaces of the predetermined pattern on the money, and the correspondence between the patterns on the mask and money is determined by examining the frequency of light flashes which emanate from the two patterns as they move into and out of coincidence. Where the lines are improperly spaced or where the lines have rough edges, the light emanating from the two patterns will not wink on and off with the proper frequency and intensity, and the apparatus will refuse to recognize the money.

Additionally, the apparatus of this invention examines purported money in a redundant manner, performing a plurality of separate and distinct tests on the money it examines where each test recognizes a known characteristic of money and where different tests are independently capable of recognizing pieces of valid money of the same predetermined denomination. Thus, in addition to optically scanning the money as indicated above, the apparatus scans the money with a magnetic detection head which ascertains the existence on the money of a predetermined pattern of printing printed with magnetizable ink. Additionally, the apparatus determines the thickness and dimensions of the money.

These various tests determine that paper articles presented to the machine are valid pieces of paper money, and the apparatus is provided with further safety features which prevent the machine from being fooled in such a way as to give out value without keeping a valuable piece of money in return. Thus, the recognizing apparatus is constructed with a single path for money movement therethrough from an intake opening to a discharge opening where the money passes into a security area such as a strong box. Rejection of counterfeits and the like is accomplished by movement along the path in reverse so that rejected paper is delivered back to the input opening. Substantial protection against fooling the machine is provided by arranging the apparatus so that the act of accepting a piece of money and returning value for it is not performed until the piece of money has traversed the full length of the path and been discharged through said discharge opening. Further security in this same manner is provided by positioning a money chopping gate at a location along the path where once a piece of money has been accepted by the apparatus, it cannot be moved in reverse along the path without puncturing and severing it into two pieces, the larger of which remains in the apparatus. Finally, these security features are combined and located in such a way that the apparatus first recognizes the money, then holds it in a conditionally accepted position while a customer may select a purchase, and finally accepts the money and delivers a commodity after selection by the customer; this temporary holding or escrow feature permits the money to be returned in a proper situation even after it has been recognized and without impairing the efficiency of the security features of the machine.

Certain additional novel arrangements are employed in the apparatus which facilitate its efficient and long term operation. By way of example, a new physical arrangement is provided for supporting and transporting a piece of paper money while it is scanned by a scanning mechanism so that the money may be moved in very tight engagement with the scanning mechanism while the money is supported in as firm a condition as possible commensurate with the physical characteristics of the paper on which it is printed and the physical requirements for supporting the paper and engaging it with the scanning mechanism.

Other objects and advantages of the invention will become apparent from the following description read in conjunction with the attached drawings in which.

Figure 1:
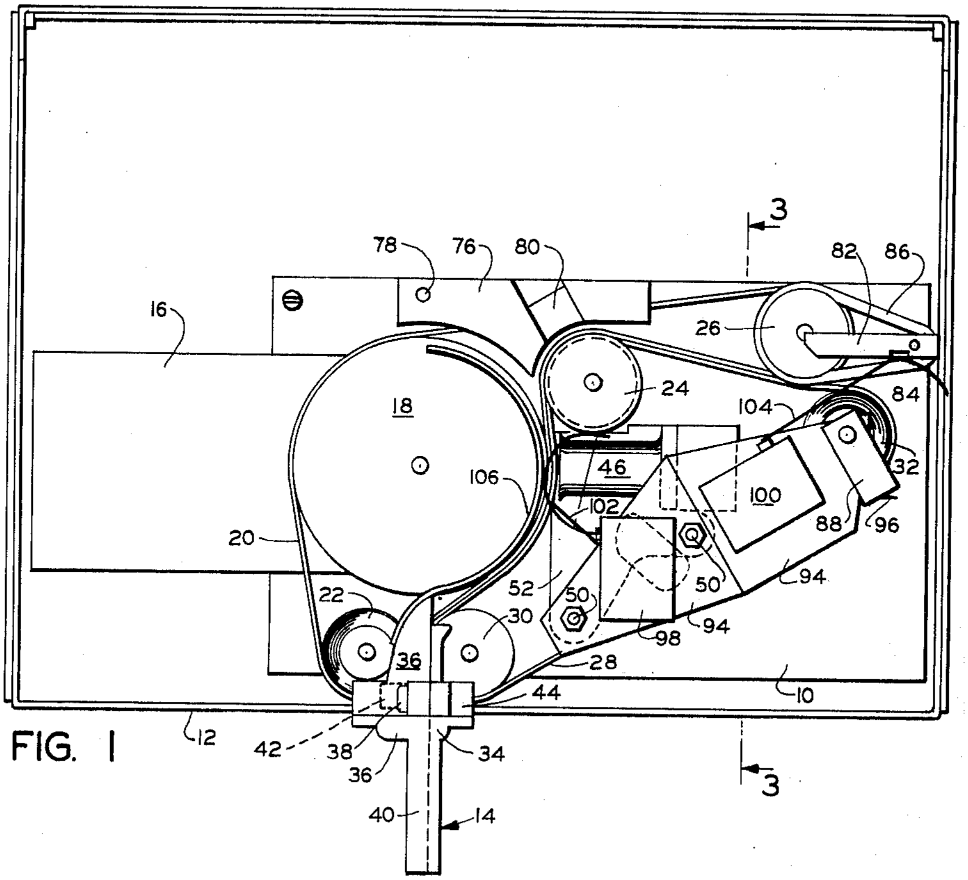
FIG. 1 is a top plan view of apparatus constructed in accordance with the principles of this invention with portions of the apparatus being omitted and broken away for clarity.
Figure 2:
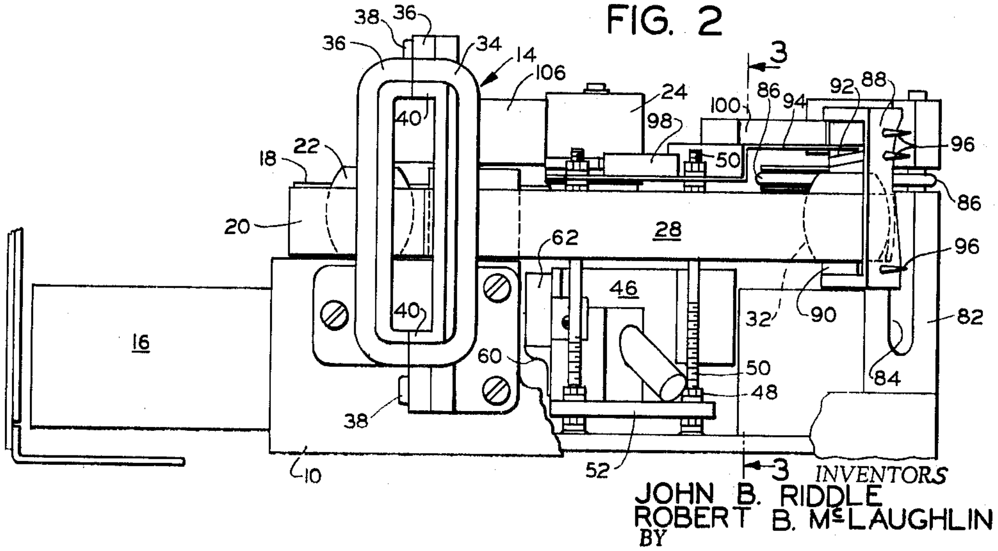
FIG. 2 is a view in front elevation of the apparatus of FIG. 1.
Figure 3:
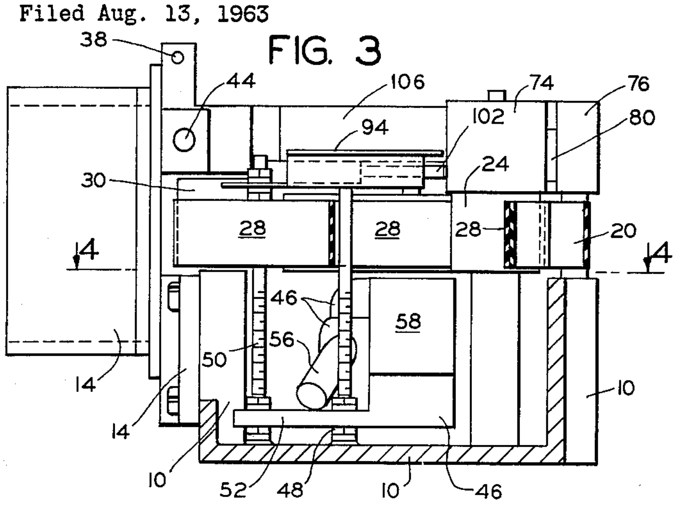
FIG. 3 is a view in vertical section of the apparatus of FIGS. 1 and 2 taken along the plane indicated at 3—3 in FIG. 2.

Referring now in detail to the drawings and particularly to FIGS. 1–3, the apparatus illustrated therein includes a frame 10 mounted in an enclosure 12 and carrying an entrance guide 14 projecting through an opening in the front of the enclosure 12 for guiding money along a linear path as it is introduced into the enclosure.

A reversible electric motor 16 is mounted on the frame 10 and supports a drive wheel 18 which engages an endless rubber belt 20 entrained over the drive wheel 18 and over idler rollers 22, 24 and 26. A second endless rubber belt 28 is entrained over idler rollers 30, 32 and 24 with the two belts 20 and 28 engaging each other along a path extending from the rollers 22 and 30 around the periphery of the drive roller 18 and periphery of the idler roller 24 to a position adjacent to the rollers 26 and 32. Along this path, the belts support and guide paper money through the enclosure, receiving money at the input guide 14 and discharging it at a discharge station adjacent to the roller 32. It should be noted that one roller on each belt is crowned, that is, the roller 22 on the belt 20 and the roller 32 on the belt 28, these crowned rollers providing effective means for maintaining the belts centered on the rollers.

The delivery chute 14 for delivering money into the enclosure 12 consists of a pair of cast body portions 34 and 36 secured together by screws 38. The body portion 34 carries a pair of flanges 40 spaced apart by a distance equal to the width of a piece of money for guiding the money into the apparatus along a longitudinal path. A light source 42 is mounted in the body 36 on one side of the path of money into the apparatus, and a photo-detector 44 is mounted on the body 34 in alignment with the light source 42 for detecting light transmitted through the path of the money, and the light source and photocell are mounted adjacent to the edge of the path so that they detect light transmitted through the portion of the path which is occupied by the unprinted edge of a bill. As explained hereinafter, the photo-detector 44 is connected to the motor 16 to start operation of the motor 16 when the intensity of light detected by the photocell is reduced to a predetermined limit indicating the introduction of a bill into the machine; the photocell 44 is further connected to means for reversing the motor 16 when the light intensity detected by the photocell 44 is reduced to a further predetermined limit as when an article inserted in the chute 14 is more opaque than money and does not transmit any light through the path to the photocell.

Figures 4, 6:
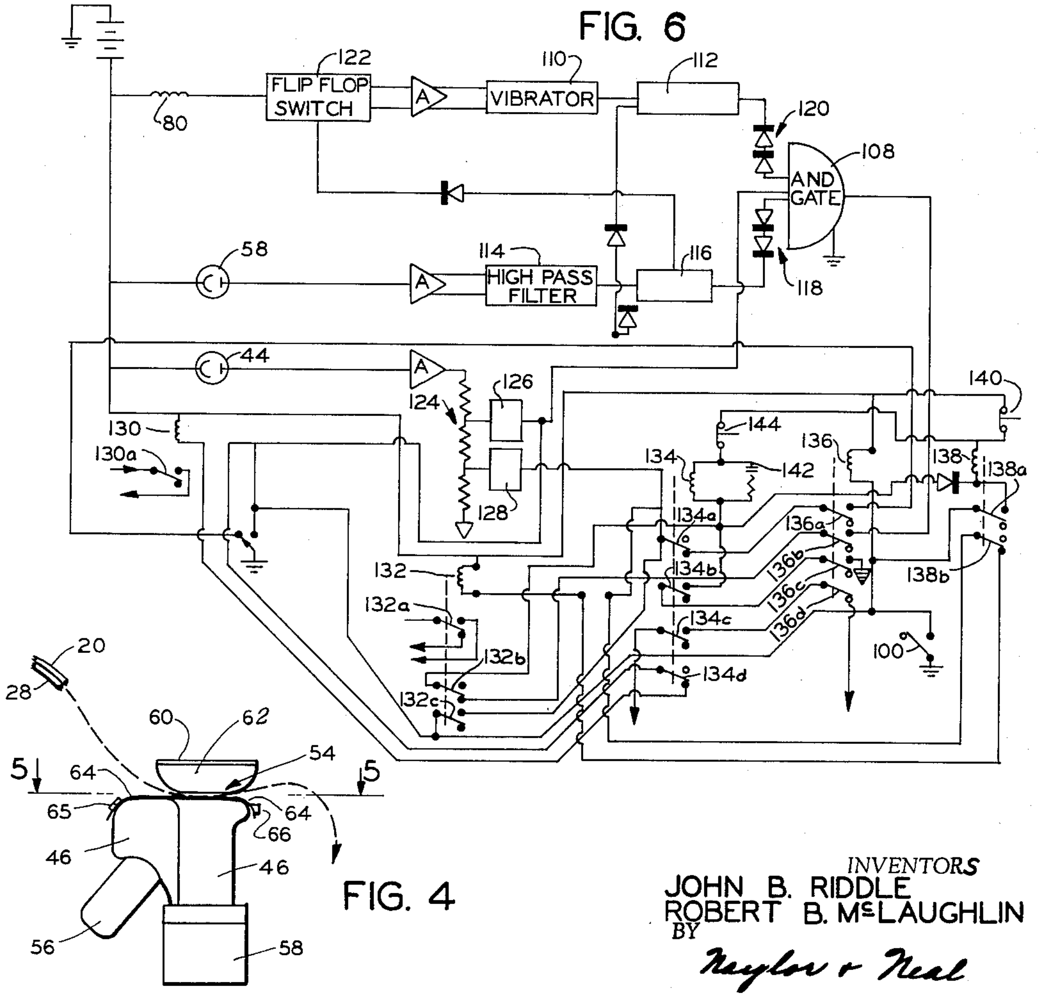
FIG. 4 is a sectional view of the apparatus taken along the plane indicated at 4—4 in FIG. 3 and illustrating the optical scanning means in the apparatus and its relation to the path of money travel through the apparatus.
FIG. 6 is a wiring diagram for the apparatus.

As illustrated in FIGS. 1–4, an optical scanning device is mounted adjacent to the path of the belts 20 and 28 in the area where the path is curved over the periphery of the drive roller 18. This optical scanning device includes a body portion 46 mounted on the frame 10 by means of nuts 48 received on a threaded rod 50 which is mounted on the frame 10 and engages a flange 52 on the body 46. The body 46 has a scanning face 54 which is tangent to the money path as indicated in FIG. 4, and the body 46 is bored to receive a light source 56 and a photo-detector 58 which are pointed toward the same local area of the face 54, the bores in which the light source and photocell are received extending completely through the body 46. A spring 60 is mounted on the body 46 and supports a foam plastic pad 62 in resilient engagement with the face 54 of the body 46 for firmly holding a bill in the path against the face of the scanning mechanism. A transparent mask 64 is mounted on the face 54 of the scanning mechanism by means of screws 66 so that the light source 56 and photocell 58 view money in the path through the mask 64.

Figure 5:
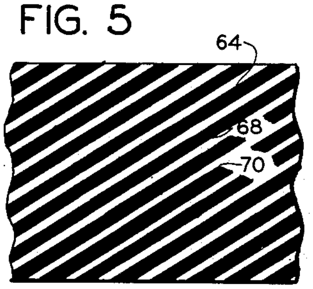
FIG. 5 is a face view of a portion of the optical scanning mask employed in the apparatus of FIG. 4.

As indicated in FIG. 5, the mask 64 carries a pattern of parallel lines 68 and spaces 70 which are equal in width to the spaces and lines respectively in an area of the printed pattern on money, as for instance in the shaded background of the words "One Dollar" on the reverse side of U.S. money, and the lines and spaces are positioned to move into and out of coincidence with the spaces and lines on a piece of money when a piece of money moves along the path. In this regard, where this pattern of parallel lines and spaces is positioned to scan the words "One Dollar" the lines and spaces are inclined to a plane parallel to the length of the path and perpendicular to the face 54 by an angle of 32 degrees which is the angle by which such lines in the words "One Dollar" are inclined to the longitudinal axis of a bill.

The photocell 58 is positioned to view a bill in the path along a direction perpendicular to the path, and the light source 56 is positioned to illuminate the path with a beam of light directed against the path at a compound angle positioned to illuminate the bill through the mask along a direction which is parallel to the lines of the mask so that the lines in the mask do not cast a shadow on the bill which is wider than the lines.

It will be noted from FIGS. 2 and 3 that the idler 24 projects upwardly above the belts 20 and 28 and is provided with a portion 74 of increased radius above the belt. The radius of the portion 74 equals the radius of the portion 24 plus the thickness of the belt 28 so that this portion 74 of the roller 24 engages and supports the portion of the bill above the belt as the belts go around this idler. An arm 76 is pivotally mounted on the frame 10 about a pivot arm 78 and is spring biased toward the roller portion 74 so that the arm 78 resiliently engages the face of a bill passing along the path. A magnetic detection head 80 is mounted in the arm 76 in engagement with the roller portion 74 for examining the printed pattern on the face of the bill and determining whether or not this pattern is printed with magnetizable ink. As indicated hereinafter, operation of the magnetic head 80 may be controlled by the detection of a suitable signal by the scanning means 46 so that the position on the bill which the magnetic head 80 analyzes may be controlled by the optical scanning mechanism, and so that the polarity of the magnetic signal may be reversed in selected places on the bill to determine the presence of both printed and unprinted areas.

Mounted adjacent to the discharge end of the belts 20 and 28 is a gate standard 82 having a recess 84 therein facing toward the path of money being discharged from the belts. An auxiliary discharge belt 86 extends over the roller 26 and the gate standard for facilitating delivery of money from the belts. A chopper arm 88 is pivotally mounted on the axle of roller 32, supported thereon by a friction washer 90 and a spring 92 which cause the arm 88 to rotate in the same direction as the roller 32. A frame 94, mounted on top of the threaded rods 50 engages the upper end of the arm 88, limiting rotation of the arm 88 in the clockwise direction as the apparatus is viewed in FIG. 1. The outer end of the arm 88 carries a plurality of very sharp needles 96 positioned to enter the slot 84 in gate standard 82 when the arm 88 rotates counterclockwise in the direction in which belts 20 and 28 move while discharging money from the input end of the apparatus. With the pivotal axis of the arm 88 being located close to the path location of the slot 84 but slightly to the left of it as it is viewed in FIG. 1, the arm 88 with its needles 96 exerts a wedging action on a bill caught between the gate standard 82 and needles 96 so that attempted withdrawal of a bill from such position toward the input end of the path causes the needles 96 to puncture the bill and sever from the bill a portion thereof which is kept in the machine. As will be apparent hereinafter, the chopping gate 88 is positioned at such a location along the path of the belt that a bill once accepted by the apparatus cannot be removed by a trailer without leaving more than half of the bill in the apparatus.

For the purposes of controlling the operation of the apparatus in accepting money passing between the belts 20 and 28, a pair of switches 98 and 100 are mounted on the support plate 94 and carry probe arms 102 and 104 respectively which project into the path of money supported by the belts to cause the switches to close as money passes the probe. A curved guide plate 106 is mounted on the body 36 above the drive roller 18 and extends around the drive roller 18 adjacent to the path of money, and the probe 102 moves between the guide 106 and the top of the drive roller 18 so that the probe 102 accurately senses the leading edge of money in the path.

The mechanical elements of the apparatus described above are interconnected by the circuit elements of FIG. 6 which includes an amplifier connected to the output of each of the detector elements 44, 58 and 80, an and gate 108 connected to the output of the magnetic detector 80 through a multi-vibrator 110 and an integrator 112 and connected to the output of the optical detector 58 through a high frequency pass filler 114 and an integrator 116 so that the and gate 108 may permit a recognition signal to pass therethrough when both of the detectors 58 and 80 have generated sufficient signals to the integrators 116 and 112. The required levels of these signals is controlled by threshold diodes 118 and 120 between the integrators and the and gate. Additionally, the output of the integrator 116 may be connected through a threshold diode to such means as flip flop switch 122 for controlling operation of the magnetic detection circuit responsive to operation of the optical circuit.

The output of the optical detector 44 at the input end of the apparatus is connected through a voltage divider 124 to a pair of Schmitt triggers 126 and 128, and the outputs of these elements are connected to five relays 130, 132, 134, 136 and 138 which are illustrated in their de-energized conditions and the arms of which are indicated as corresponding letter subscripts. Relay 130 controls the starting and stopping of the motor 16 by reason of the connection of arm 130A in series with the field coils of motor 16; the motor is started when the potential at Schmitt trigger 126 falls to a predetermined level when a piece of money passes in front of the detector 44, and the motor continues to operate as long as the potential at Schmitt trigger 126 does not return to its initial condition and as long as no paper in the money path engages either of the switches 98 and 100 provided that the motor may be stopped for temporary holding of money by the relay 138.

The relay 132 controls the direction of operation of the motor 16 by connection of the direction controlling leads of the motor 16 to the arm 132A. The arm 132B permits examined money to be accepted only when the motor 16 has not been switched into reverse, and the arm 132C locks the reverse relay 132 in reverse condition after the relay is energized and until all articles in the money path of the apparatus are delivered out of the apparatus through the input chute 14. The reverse relay may be energized to refuse to accept money at any time prior to recognition of money by: closing of the Schmitt trigger 128 caused by an excessively opaque object in front of the detector 44, closing of the switch 100 prior to recognition of a piece of money by the relay 134, or actuation of the pay-back switch 140.

The relay 134 controls recognition of money which passes the tests controlled by the and gate 108. The arm 134A causes the reverse relay to operate if the switch 100 is engaged by a piece of paper prior to operation of the relay 134. Arm 134B holds the relay 134 in energized condition until a recognized piece of money passes beyond the switch 100 to permit the switch 100 to open aagin. The arm 134C permits the passage of a "money accept" pulse through the arm 136D if the relay 134 is energized at the time switch 100 opens again; it should be noted that a time delay circuit 142 is provided on the coil of relay 134 to delay the de-energization of relay 134 when relay 136 is de-energized. The arm 134D stops operation of the motor 16 when a bill is recognized by relay 134 to stop further operation of the apparatus until the purchaser presses pay out switch 144 selecting a commodity to be purchased or pay back switch 140 if change is required or if the commodity selected is out of stock. Relay 134 is energized to recognize money through arm 136B at the time switch 100 closes if reverse relay 132 has not been energized prior to that time and if at the time switch 100 closes the integrators 112 and 116 have accumulated sufficient signal, no article is present in front of the detector 44, and the motor 16 is on. When relay 134 has been energized to recognize a piece of money and has stopped motor 16 to permit the purchaser to select a commodity, the motor 16 is restarted and held on in forward direction by the opening of relay 134 and until the bill passes switch 100 when the pay out switch 144 is operated, but if the pay back switch 140 is operated, the accept relay 134 is de-energized, and the reverse relay 132 is energized through arm 134A and arm 136A when the bill passes beyond switch 98.

Relay 136 causes generation of the money accept signal at the time money passes beyond the switch 100 as indicated above, and relay 134 operates during the holding period when the purchaser selects a commodity and during the pay out period to prevent reversal of the motor through arms 134A and 136A and 138B.

To review the sequence of operations of the apparatus as illustrated in FIG. 6, the following events take place when a piece of money is presented to the apparatus: The bill passes in front of the scan light 44 causing the motor to start on-forward if the density of the money is correct; the motor does not start on at all if too much light is transmitted through the money, and the motor starts on in reverse if the money is too dense. As the bill passes along its path to the optical scanning mechanism 46 the squelch circuit connected to switch 98 insures zero reading on the two integrators which are connected to the and gate. When the bill reaches switch 98 and causes the switch to operate, the squelch circuit is removed from the integrators, and switch 98 holds the motor in an on-forward condition. The optical and magnetic scanning devices then check the bill for required pattern characteristics. Good bills build up sufficient signals in their integrators to pass an acceptable signal to the and gate through the threshold diodes. When the leading edge of the bill progresses to the switch 100 and closes the switch 100, the switch 100 enables the accept relay 134 to close if the motor is still operating in a forward direction with the light at the input end of the patch unobstructed and if all signals at the and gate are in sufficient condition for recognition of money; at the time that switch 100 closes, switch 98 must still be energized to prevent the motor from being switched into reverse, and the switches 98 and 100 are spaced apart by sufficient condition along the path that they insure the full length of the bill is present. If the relay 134 closes, recognizing the money, the motor is stopped to permit the purchaser to select a commodity. The purchaser then depresses either the pay-back switch 140 or the pay-out switch 144 to either take a commodity or recover his money, and the pay-back switch may be an automatic switch which opens when accompanying apparatus indicates that a commodity is exhausted. When the pay-back switch is opened, the prior recognition of money by relay 134 is cancelled, and the motor is turned on in reverse to return the money. When the pay-out switch is opened, the motor is restarted in its forward direction while the relay 134 prevents reversal of the motor, and the motor continues in its forward direction until the money clears the switch 100; at the time that the money clears the switch 100, the apparatus accepts the money, gives out a signal permitting the dispensing of a commodity or the like, and turns off the motor with all of the circuit elements in condition for restarting another cycle. At any time during the sequence, if the motor is switched into reverse, the apparatus is prevented from paying out, and the motor is held in reverse until the entire money path through the apparatus has been cleared; during this reverse movement, the chopper gate at the discharge end of the path closes to puncture and retain in the apparatus any article which has progressed too far along the path with the chopper gate also preventing the discharge of money previously accepted. It will be noted that if the pay-back switch 140 is broken after the pay-out switch has been broken but before money has cleared the switch 100, the bill may have progressed a sufficient distance beyond the chopper gate that the chopper gate may engage the bill since opening of the pay-back switch will override a prior order to pay out and will switch the motor into reverse at any time before the switch 100 opens; when it may be desirable to prevent this occurrence, a solenoid may be provided on the chopper gate controlled through the pay-back switch and the switch 100 to prevent rotation of the chopper gate while the switch 100 is closed and the pay-back switch is opened.

While one specific embodiment of the invention has been illustrated and described in detail herein, it is obvious that many modifications thereof may be made without departing from the spirit and scope of the various concepts forming the invention.

What is claimed is:

1. Apparatus for recognizing money where said money has, in a predetermined area of a face thereof, a uniform pattern of parallel lines and spaces which apparatus comprises: a mask having a pattern of parallel spaces and lines which correspond to said lines and spaces respectively of said money, support and transport means for the patterns of lines on said mask and a piece of money for moving said patterns with respect to each other along a path which is linear as viewed perpendicular to said face of said money while maintaining the lines of said patterns substantially parallel to each other and while supporting said predetermined area of said money and said mask in engagement with each other, a light responsive detector mounted in fixed space relation with one of said patterns and positioned to detect light from both of said patterns and generate an electrical signal which is a parameter of the light emanating from said patterns, illuminating means for illuminating said patterns and recognizing means connected to said detector for recognizing a piece of money responsive to the frequency of said signal generated by said detector.

2. The apparatus of claim 1 characterized further by the inclusion of illuminating means mounted in fixed space relation with one of said patterns and positioned to direct light toward said pattern along a direction which when projected on a plane parallel to said pattern is parallel to the lines of said pattern.

3. The apparatus of claim 1 in which said detector is mounted in fixed space relation with said mask, a light source is mounted in fixed space relation with said mask and on the same side thereof as said detector with said mask positioned to direct light through said mask to said money while said detector detects said light reflected back through said mask from said money.

4. The apparatus of claim 3 in which a resiliently deformable back up member is mounted on the side of said mask opposite to said detector and in engagement with said mask for pressing money against said mask and pressing said mask against said detector.

5. In currency recognizing apparatus having receiving means for receiving individual pieces of paper money, a scanning station, and means for moving said station and a received piece of money with respect to each other in a predetermined linear direction and at a predetermined speed the improvement comprising a mask mounted on said scanning station where said money carries a pattern of parallel and equally spaced lines separated by spaces and inclined to said predetermined direction by a predetermined angle, said mask having a pattern of lines and spaces parallel to and corresponding to said pattern of spaces and lines respectively carried by said money, a photo-responsive signal generator positioned to detect light which emits from both said area of said money and said mask and generate an electrical signal which is a parameter of said detected light, illuminating means for emitting light to said signal generator from both said area and said mask, a high-frequency-pass filter connected to said signal generator for filtering from said signal components having frequencies below a predetermined frequency which is a parameter of said predetermined speed, the spacing of said lines in said area and the angle of inclination thereof to said direction, and recognizing means connected to said high-frequency-pass filter for accepting money responsive to the passage of a high frequency signal through said filter.

6. The apparatus of claim 1 characterized further in that said receiving means comprises means for supporting a piece of money with said portion thereof curved during relative movement of said money and said signal generator with a radius of curvature less than the length of said money.

7. In currency recognizing apparatus having receiving means for receiving individual pieces of paper money, a scanning station, and means for moving said station and a received piece of money with respect to each other in a predetermined linear direction and at a predetermined speed the improvement comprising a mask mounted on said scanning station where said money carries a pattern of parallel and equally spaced lines separated by spaces and inclined to said predetermined direction by a predetermined angle, said mask having a pattern of lines and spaces parallel to and corresponding to said pattern of spaces and lines respectively carried by said money, a photo-responsive signal generator mounted at said scanning station on the side of said mask opposite to the path of money past said station, illuminating means mounted at said scanning station on the same side of said mask as said signal generator with said illuminating means positioned to direct a beam of light toward said mask in a plane which is substantially perpendicular to said mask and intersects said mask along a line parallel to said lines on said mask, recognizing means for recognizing a piece of money responsive to operation of said signal generator.

8. Document identifying apparatus which comprises scanning means adapted to generate a recognizable signal when said scanning means and an identifiable document are moved with respect to each other and in engagement with each other, recognizing means connected to said scanning means for recognizing said recognizable signal and transport and support means for moving said scanning means and a document with respect to each other while supporting said document in a condition with one face thereof curved and in engagement with said scanning means.

9. The apparatus of claim 8 in which said transport and support means comprises means for supporting said document with the curved portion having opposite faces which are unsupported by said transport and support means and engage said scanning means.

10. Apparatus for identifying paper money which comprises: a frame, scanning means mounted in fixed position on said frame with said scanning means having a scanning face and being adapted to generate a recognizable signal when a piece of money is moved past said scanning means in engagement with said face, recognizing means connected to said scanning means for recognizing said recognizable signal, and conveyor means mounted on said frame and defining a path for money movement past said scanning means in engagement with said face where said path, in the area of said face, is curved in a plane perpendicular to said face and parallel to the direction of said path.

11. The apparatus of claim 10 in which said path has a portion thereof spaced away from said conveyor means in an area adjacent to said scanning means, and said scanning means engages said path in said area.

12. The apparatus of claim 10 in which said conveyor means comprises a pair of endless movable belts having peripheral portions engaging each other and defining a portion of said path therebetween with said belts having widths engageable with money in said path which are less than the width of paper money whereby paper money in said path has an exposed face portion adjacent to said belts, and said scanning means is positioned away from said belts with its scanning face positioned to engage the exposed face of money in said path.

13. The apparatus of claim 12 characterized further by the inclusion of resiliently deformable backing means mounted on said frame adjacent to said scanning means on the side of said path opposite to said scanning means and resiliently engaging said scanning face.

14. Apparatus for recognizing money comprising an entrance opening money transport means for moving money from said entrance opening to an examination location in said apparatus, reversing means for said transport means for delivering unrecognizable objects from said apparatus, a light source mounted on one side of said entrance opening, a photo-responsive detector mounted on the other side of said entrance opening and positioned to detect light passing through an unprinted area of said money at said opening from said light source, start means for starting said transport means responsive to predetermined reduction in the intensity of light detected by said detector, and object rejection means for actuating said reversing means responsive to both inadequate and excessive reduction in the intensity of light detected by said detector.

15. Apparatus for recognizing paper money which comprises an enclosure having an opening thereinto, transport means defining a path for moving money through said enclosure from said opening, means defining a predetermined location in said enclosure, means in said apparatus for recognizing valid pieces of money, and means for piercing and holding money in said enclosure normally positioned outside of said path and movable into said path responsive to movement of money from said location toward said opening.

16. The apparatus of claim 15 in which said means for piercing and holding comprises a gate positioned on one side of said path adjacent to said location a bracket mounted on the money moving means on the opposite side of said path for pivotal movement about an axis between said location and said opening from a position remote from said path to a position adjacent to said path, means for pivoting said bracket from said remote position to said adjacent position responsive to movement of the money moving means from said location toward said opening, and a plurality of needles mounted on said bracket and projecting therefrom across said path and into said gate when said bracket is in said adjacent position.

17. Apparatus for recognizing money which comprises an enclosure having an opening thereinto, transport means for moving articles through said enclosure from said opening and returning articles from said enclosure through said opening, means for recognizing valid pieces of money at a predetermined location in said enclosure and returning unrecognizable articles to said opening prior to the arrival of said articles at said predetermined location, and means mounted between said location and said opening for piercing and holding a piece of money at a position between its center and said opening responsive to movement of money from said location toward said opening.

References Cited by the Examiner

UNITED STATES PATENTS

| | | | |
|---|---|---|---|
| 333,233 | 12/1885 | Landgrane | 232—63 |
| 632,040 | 8/1899 | Braun | 232—5 |
| 2,609,928 | 9/1952 | Doust. | |
| 2,731,621 | 1/1956 | Sontheimer. | |
| 2,877,822 | 3/1958 | Timms | 88—14 |
| 2,896,763 | 7/1959 | Gisser | 194—4 |
| 2,964,641 | 12/1960 | Selgin | 194—4 |
| 2,995,976 | 8/1961 | Weingart. | |
| 3,064,785 | 11/1962 | Weingart | 194—4 |
| 3,090,485 | 5/1963 | Moore | 194—4 |
| 3,109,100 | 10/1963 | Gecewicz | 194—4 XR |
| 3,153,483 | 10/1964 | Simjian | 194—4 XR |
| 3,159,277 | 12/1964 | Carlson | 194—4 XR |

HUGO O. SCHULZ, *Primary Examiner.*

SAMUEL F. COLEMAN, *Examiner.*

H. C. HORNSBY, *Assistant Examiner.*